(12) United States Patent
Kusada et al.

(10) Patent No.: US 7,059,116 B2
(45) Date of Patent: Jun. 13, 2006

(54) POWER OUTPUT APPARATUS AND CONTROL METHOD FOR SAME

(75) Inventors: Masaki Kusada, Toyota (JP);
Katsuhiko Yamaguchi, Nissin (JP);
Toshio Inoue, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 91 days.

(21) Appl. No.: 10/848,122

(22) Filed: May 19, 2004

(65) Prior Publication Data

US 2004/0237510 A1    Dec. 2, 2004

(30) Foreign Application Priority Data

May 26, 2003   (JP)   ............................. 2003-147490
Sep. 2, 2003   (JP)   ............................. 2003-310169

(51) Int. Cl.
*F01N 3/00*   (2006.01)

(52) U.S. Cl. .......................... 60/285; 60/274; 60/280; 60/286; 180/65.3; 180/65.4; 123/406.46; 123/406.52

(58) Field of Classification Search .................. 60/274, 60/280, 284, 285, 286, 290; 180/65.2, 65.3, 180/65.4; 123/406.45, 406.46, 406.52, 406.53
See application file for complete search history.

(56) References Cited

U.S. PATENT DOCUMENTS

| | | | | |
|---|---|---|---|---|
| 6,351,942 B1* | 3/2002 | Nishimura et al. | ........... | 60/285 |
| 6,543,220 B1* | 4/2003 | Yoshida et al. | ............... | 60/285 |
| 6,615,578 B1* | 9/2003 | Yamazaki et al. | ........... | 60/284 |
| 6,681,564 B1* | 1/2004 | Nishiyama et al. | ........... | 60/285 |
| 6,845,749 B1* | 1/2005 | Kubo | .................... | 123/339.11 |
| 6,935,100 B1* | 8/2005 | Miura | ......................... | 60/284 |

FOREIGN PATENT DOCUMENTS

| | | | |
|---|---|---|---|
| JP | A 5-26138 | | 2/1993 |
| JP | A 5-328528 | | 12/1993 |
| JP | A 6-141405 | | 5/1994 |
| JP | A 8-28417 | | 1/1996 |

* cited by examiner

*Primary Examiner*—Binh Q. Tran
(74) *Attorney, Agent, or Firm*—Oliff & Berridge, PLC

(57) ABSTRACT

During the catalyst warm-up period, when control enabling reduction in hydrocarbons is not executed in gasoline engine 100, the opening of the throttle valve 101 is made smaller in order to reduce the hydrocarbon discharge. During the catalyst warm-up period, when control enabling reduction in the quantity of hydrocarbons is executed in gasoline engine 100, the opening of the throttle valve 101 is made larger in order to accelerate warm-up of the catalyst, thereby shortening the catalyst warm-up period. A shorter catalyst warm-up period enables reduction in the total quantity of hydrocarbons from engine startup to the end of the catalyst warm-up period.

24 Claims, 8 Drawing Sheets

Fig.2

| Engine operating mode | | | Application conditions | Battery charge request | Throttle valve opening | Throttle control mode |
|---|---|---|---|---|---|---|
| Warm-up mode | | | During catalyst warm-up period and predetermined period after starting gasoline engine | N/A | Small opening | Small opening mode |
| Low HC control mode | Low HC charge mode | | During catalyst warm-up period and after predetermined period after starting gasoline engine | Present | Large opening + opening for charge | Large opening charge mode |
| | Low HC non-charge mode | | | Non | Large opening | Large opening mode |
| Normal mode | Charge mode | | After catalyst warm-up period ends | Present | Accelerator dependent opening + opening for charge | Throttle charge mode |
| | Non-charge mode | | | Non | Accelerator dependent opening | Throttle normal mode |

Hydrocarbon discharge

POWER OUTPUT APPARATUS AND CONTROL METHOD FOR SAME

BACKGROUND OF THE INVENTION

1. Field of the Invention

The present invention relates to a power output apparatus, and control method therefor.

2. Description of the Related Art

To date, a number of techniques are applied for reducing hydrocarbon emissions, which are harmful substances within the exhaust gas of an engine. For example, a catalyst inside the exhaust system of an engine is effective for hydrocarbon discharge reduction. The catalyst is activated by being warmed by the exhaust gas from the engine, whereby it exhibits the ability to reduce hydrocarbon emissions.

There are three main methods to reduce hydrocarbon emissions prior to activation of the catalyst. One of the methods is to delay the engine ignition timing in one cycle to the retard side by a predetermined value or more. The technique of delay the engine ignition timing in one cycle to the retard side by a predetermined value or more shall hereinafter be referred to simply as retarding the ignition timing.

The second method is to set a valve overlap period, during which both the intake and exhaust valves are open, to a predetermined value or higher. Where valve overlap is set to a predetermined value or higher, combustion gases are blown back to the intake port, and thus hydrocarbons are also blown back to the intake port as well. Hydrocarbon discharge from the exhaust port is reduced by an extent commensurate with the portion blown back to the intake port, thereby making it possible to reduce hydrocarbon emissions.

The third method involves shifting the air/fuel ratio to lean. Carbon is contained in the gasoline normally used as engine fuel. If the air/fuel ratio, i.e. the ratio of air to fuel supplied to the engine, is lean, the amount of fuel will be a relatively small, thereby reducing the quantity of carbon, which is of course a constituent of hydrocarbons, making it possible to reduce hydrocarbon emissions.

In JP6-141405A, it is proposed to control the intake airflow to the engine to a low flow rate when the catalyst is in a non-heated state, in order to reduce the amount of exhaust and hydrocarbon emissions. In JP8-28417A, it is proposed to retard the ignition timing in order to reduce hydrocarbon emissions.

If, however, the quantity of intake air to the engine is maintained at a low flow rate until the catalyst is activated, the amount of exhaust available for activating the catalyst will also be less, and consequently the period needed to warm-up the catalyst will be longer, resulting in an increase in the total amount of hydrocarbons discharged during that period.

For the reasons indicated below, these three methods for reducing the hydrocarbon discharge before activating the catalyst are not readily applicable just after starting the engine. The first method for reducing hydrocarbon emissions involves retarding the ignition timing. Because combustion can easily become unstable directly after starting the engine, however, there is a danger of misfire occurring due to the retard of the ignition timing.

The second method for reducing hydrocarbon emissions involves setting valve overlap to a predetermined value or higher. When starting the engine, however, valve overlap must be set to a small amount in order to ensure stable idling. Furthermore, because the engine rotation will not increase the oil pressure enough to change the valve timing when the engine starts, the valve timing may not be changed. Accordingly, it is difficult to set the amount of valve overlap to a predetermined value or higher just after starting the engine, making it difficult to implement the second method.

The third method to for reducing hydrocarbon emissions involves a lean air/fuel ratio. However, because combustion is unstable directly after a cold start of the engine, if a large amount of fuel is not injected, there is a danger of misfire, and conversely there is actually an increase in hydrocarbon emissions. In other words, it is preferable to have a rich air/fuel ratio. In addition, directly after cold starting the engine, the level of friction is high and there is a great deal of variation in the condition of the intake ports of each cylinder. Because of this, it is preferable to have a rich air/fuel ratio in order to stabilize the engine rotation and enable stable combustion in all the cylinders. Thus, the third method is also difficult to implement.

SUMMARY OF THE INVENTION

An object of the present invention is to reduce hydrocarbon emission when starting the engine.

According to an aspect of the present invention, a power output apparatus comprises: an engine that outputs power to a drive shaft; an air flow rate adjustment mechanism that adjusts the air flow rate supplied to the engine; an exhaust system having a catalyst, for discharging exhaust gas from the engine; a first suppression controller that, after startup of the engine, controls the air flow rate adjustment mechanism so as to limit the air flow rate to a level equal to or less than a predetermined flow rate; and a second suppression controller that, at predetermined timing, transitions operation of the engine to a state of operation at a lowered hydrocarbon level established so as to reduce the quantity of hydrocarbons within the exhaust gas, and cancels the limit on the air flow rate.

In this power output apparatus, the reduction of the air flow rate by the first suppression controller leads to the reduction of the quantity of exhaust gas from the engine, thereby reducing the amount of hydrocarbons discharged. Since the hydrocarbon discharge is reduced by means of the air flow rate control, it is possible to arbitrarily perform various controls for stabilizing the engine operation immediately after engine startup, such as advancing of the ignition period, and shifting of the air/fuel ratio to rich side.

After a predetermined timing, for example, once a predetermined period has elapsed since the engine is started, hydrocarbon discharge can be reduced by means of operating the engine in a reduced hydrocarbon operation state. Where engine is operated in a reduced hydrocarbon operation state, since hydrocarbon discharge can be reduced by means of controlling the operation of the engine, the limit on the air flow rate may be canceled. Canceling the limit on the air flow rate makes it possible to ensure an air flow rate consistent with a requested output for the power output apparatus.

The air flow rate adjustment mechanism may be a throttle, a supercharger or an electrically driven variable valve timing mechanism.

According to another aspect of the present invention, a power output apparatus comprises: an engine that outputs power to a drive shaft; an air flow rate adjustment mechanism that adjusts the air flow rate supplied to the engine; an exhaust system that discharges exhaust gas from the engine; a catalyst disposed in the exhaust system; a normal controller that performs normal operation of the engine when the catalyst has been activated; a first hydrocarbon suppression controller that, when the catalyst has not been activated, controls operation of the engine so as to reduce the concentration of hydrocarbons within the exhaust to an amount less than that during normal operation, before passage through the catalyst; and a second hydrocarbon suppression controller that, during at least a predetermined period. after startup of the engine, prohibits operation of the first hydrocarbon suppression controller, and controls the air flow rate adjustment mechanism so as to reduce the air flow rate to a value equal to or less than a predetermined value.

The following three methods are applicable in lowering hydrocarbon discharge: reducing the air flow rate supplied to the engine; operating the engine in a state where the hydrocarbon content of the exhaust before it passes through the catalyst is less than that during normal operation (hereinafter simply referred to as "lowered hydrocarbon control"); and activating the catalyst.

The air flow rate is lowered to reduce the hydrocarbon discharge just after startup of the engine. After a predetermined period has elapsed since starting the engine, hydrocarbon discharge is lowered through the lowered hydrocarbon control. Once the catalyst is activated, hydrocarbon discharge is lowered by the catalyst.

The three methods mentioned above may be combined as appropriate. By lowering the air flow rate to reduce the hydrocarbon discharge just after starting the invention, it becomes possible to arbitrarily carry out control for stabilizing operation of the engine. By lowering hydrocarbon discharge through the lowered hydrocarbon control once a predetermined period has elapsed since starting the engine, it becomes possible to arbitrarily adjust the air flow rate to the engine. By lowering hydrocarbon discharge by means of the catalyst once the catalyst is activated, it becomes possible to arbitrarily control both air flow and the engine, and to carry out engine control in consideration of fuel efficiency and drivability.

In addition to the power output apparatus arrangement described above, the invention may be embodied as a method for controlling a power output apparatus. Not all of the features described above need to be furnished, omitting some or combining them as appropriate. Embodiment in a hybrid vehicle equipped with a power output apparatus would also be possible.

These and other objects, features, aspects, and advantages of the present invention will become more apparent from the following detailed description of the preferred embodiments with the accompanying drawings.

BRIEF DESCRIPTION OF THE DRAWINGS

FIG. 2 is an explanatory drawing that describes the engine operating mode and throttle control mode.

DESCRIPTION OF THE PREFERRED EMBODIMENT

Figure 1:
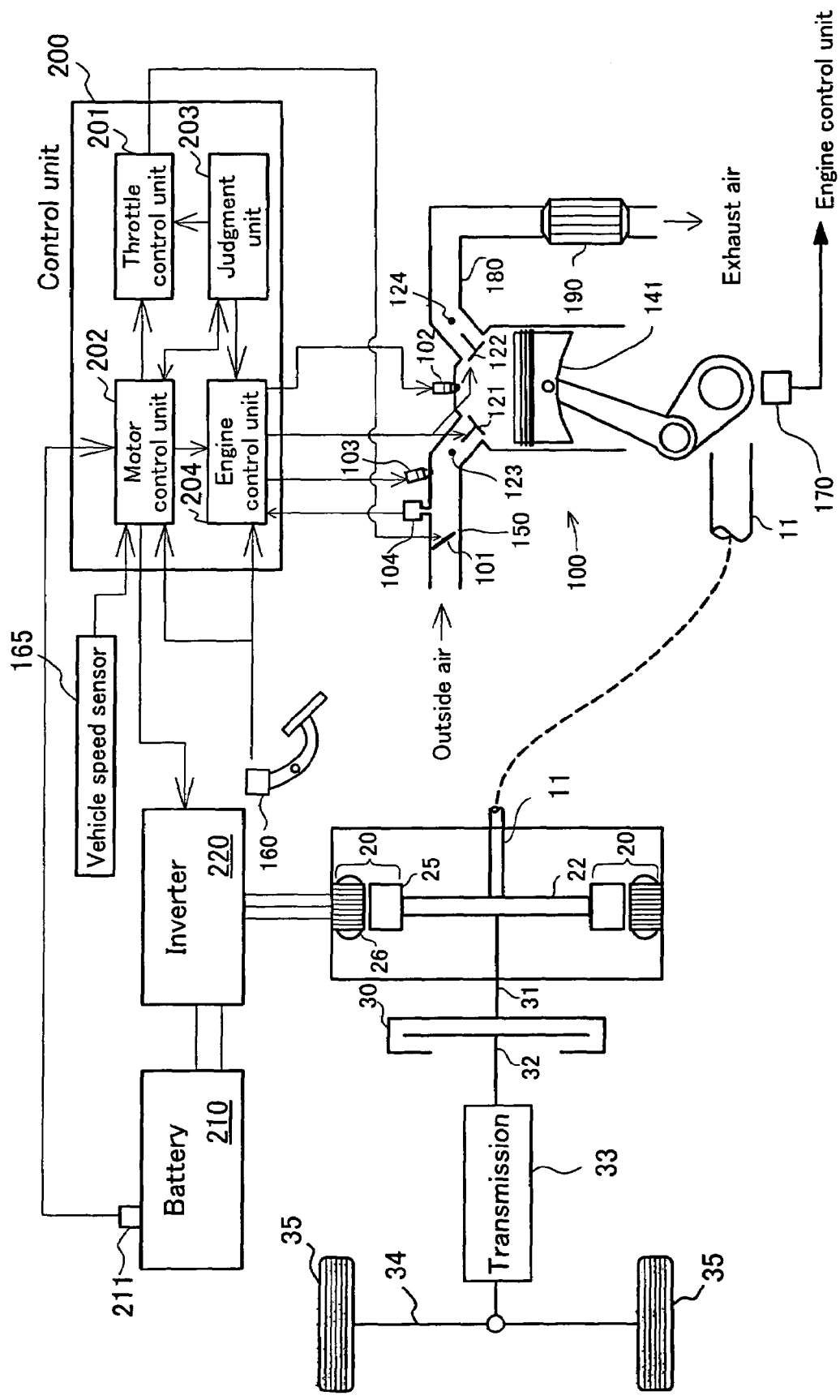
FIG. 1 is an outline compositional view of a hybrid vehicle shown by way of a embodiment.

The embodiments of the invention follows in the following order.
A. Embodiment:
B. Variations A. Embodiment FIG. 1 is a simplified schematic of a hybrid vehicle embodying the present invention. This hybrid vehicle has a gasoline engine 100 and a motor 20 as power sources. In this embodiment, the motor 20 is a synchronous motor; however, an induction motor or other type of alternating current motor, or a direct current motor could be used.

Crankshaft 11 of the gasoline engine 100 is linked to a flywheel 22. Rotor 25 of motor 20 is attached to the outer periphery of the flywheel 22, and stator 26 of motor 20 is fixed to the housing at a position corresponding to the outer periphery thereof.

Motor 20, powered by a battery 210 is used as a drive power source for the hybrid vehicle. Direct current supplied from the battery 210 is transformed into three-phase AC by an inverter circuit 220, and the three phase AC output is then supplied to the motor 20. The power source is not limited to a battery 210 various other chargeable/dischargeable charge storage means, such as a capacitor, may be used instead.

The motor 20 also functions as a generator to regenerate electrical power. The motor 20 converts torque output from the gasoline engine 100 and torque transmitted from the drive shaft 34 to electrical power, and then charges the battery 210 with this electrical power.

Torque output by gasoline engine 100 is output from an output shaft 31. This torque may be increased or decreased by powering or regenerating operation of the motor 20.

The output shaft 31 is linked via a clutch 30 to an input shaft 32 of a transmission 33. Output from the transmission 33 is transmitted to the drive shaft 34 and the drive wheels 35 through a differential gear (not shown in the drawing).

The interior of the gasoline engine 100 and the peripheral devices will be described. Reference is made to the detailed illustration of gasoline engine 100 appearing at lower right in FIG. 1. Gasoline engine 100 comprises an intake port 123 that draws air into the combustion chamber, and an exhaust port 124 that discharges exhaust gas from the combustion chamber. An intake valve 121 is provided at the portion where the intake port 123 opens to the combustion chamber, and an exhaust valve 122 is provided at the portion where the exhaust port 124 opens to the combustion chamber.

The intake valve 121 and the exhaust valve 122 are driven by respective cam mechanisms, with up and down motion by piston 141. In addition, the intake valve 121 and the exhaust valve 122 comprise a valve timing change mechanism with variably-controllable open/close period depending on the load on the engine 100. As the valve timing change mechanism, there may also be employed an arrangement that utilizes oil pressure of an oil pressure pump driven by the engine to change the relative setting angle of the cam and camshaft.

An intake passageway 150 is connected to the intake port 123 to direct outside air to the cylinder head; and a throttle valve 101 and a fuel injection valve 103 is provided in the intake passageway 150. Here, by way of example there is depicted port injection whereby fuel is injected from a fuel injection valve 103 towards the intake port 123; however, direct injection whereby fuel is injected into the combustion chamber may also be possible.

The throttle valve 101 regulates the amount of air supplied to the gasoline engine 100. If the throttle valve 101 opening is large, the amount of air supplied to the gasoline engine 100 will increase, and the output of the gasoline engine 100 will be greater. If the throttle valve 101 opening is small, the opposite will occur.

An intake pressure sensor 104 is provided in the intake passageway 150, making it possible to detect the pressure inside the intake passageway.

Spark plug 102 is a device for igniting, by means of a high-voltage spark, a mixture of gasoline and air supplied to the engine.

An exhaust passageway 180 of gasoline engine 100 discharges exhaust gas from the engine to the outside of the vehicle. A catalytic converter 190 is provided inside the exhaust passageway 180. The catalytic converter 190 includes catalyst to purify hydrocarbons within the exhaust gas. If the catalyst is not activated, however, purifying action cannot be achieved.

Operation of each part of the hybrid vehicle is controlled by a controller 200. The controller 200 is a microcomputer including a CPU, RAM, and ROM; it controls each part according to control software.

As will be described in greater detail later, the controller 200 acquires information from a crank angle sensor 170 provided on the crank shaft 11, an accelerator level sensor 170 built into the accelerator pedal, a remaining capacity sensor 211 for the battery 210, an intake pressure sensor 104, and a vehicle speed sensor 165. The vehicle speed sensor 165 determines "vehicle speed" from the rotational speed of the drive wheel 35, and then outputs that information. Alternatively, the vehicle speed sensor 165 may be a vehicle speed calculation device that calculates the vehicle speed from engine rotational speed and gear ratio, or a device that detects the distance traveled and travel time of the vehicle from satellites or the like, and then computes the vehicle speed.

The controller 200 controls the spark plug 102, the fuel injection valve 103, the valve timing change mechanism (such as the intake valve 121 and the exhaust valve 122), and the throttle valve 101. The controller 200 also controls the motor 20 by means of outputting motor drive control signals to the inverter 220.

A judgement unit 203 of the controller 200 determines an operating mode of the gasoline engine 100, which is defined by parameters including an air/fuel ratio, ignition timing and valve opening characteristics (hereinafter referred to as engine operating mode), and also determines a control mode of the throttle valve 101 (hereinafter referred to as throttle control mode). Both engine operating mode and throttle control mode have multiple modes. The judgement unit 203 determines which mode is to be used for each of the engine operating mode and throttle control mode on the basis of operating conditions of the hybrid vehicle, and charge requests for the battery 210 supplied from a motor controller 202. The judgement unit 203 notifies the modes to be used to the engine controller 204, throttle controller 201 and motor controller 202, as appropriate.

When the detection result of the remaining capacity sensor 211 of the battery 210 is equal to or less than a predetermined value, the motor controller 202 outputs a battery charge request to the judgement unit 203. The motor controller 202 also determines a target torque, based on factors such as the accelerator level detected by the accelerator level sensor 160, and the vehicle speed detected by the vehicle speed sensor 165; and then outputs a motor drive control signal to the inverter 220.

The engine controller 204, taking into consideration the engine operating mode determined by the judgement unit 203, calculates a fuel injection quantity and ignition timing, as well as determining changes in the valve timing to control the gasoline engine 100.

The throttle controller 201, taking into consideration the throttle control mode determined by the judgement unit 203, controls the throttle valve 101.

The following description of engine operating mode and throttle control mode makes reference to FIG. 2. In this embodiment, engine operating modes include a "warm-up mode", a "low HC control mode", and a "normal mode".

The condition for implementing "warm-up mode" is that it is in a period during catalyst warm-up, and that it is also in a predetermined period after startup of the gasoline engine 100. "Warm-up mode" is a mode to be selected with the objective of stably operating the gasoline engine 100 just after starting the engine. The predetermined period is the period until the gasoline engine 100 can operate in the subsequent "low HC control mode". This will be described in detail later.

The condition for implementing "low HC control mode" is that it is in a period during catalyst warm-up, and that it is after the predetermined period of time has passed from startup of the gasoline engine 100. "Low HC control mode" is a mode to be selected with the objective of lowering hydrocarbon discharge by the gasoline engine 100.

The condition for implementing "normal mode" is that the catalyst has warmed up. "Normal mode" is a mode to be selected with the objective of operating the gasoline engine 100 normally after catalyst warm-up.

The "low HC control mode" and the "normal mode" are each divided into two sub-modes depending on whether or not there is a battery charge request. For "low HC control mode", the mode will be either a "low HC charge mode" when there is a battery charge request, or a "low HC non-charge mode" if there is no battery charge request. For "normal mode", the mode will be a "charge mode" when there is a battery charge request, or "non-charge mode" if there is no battery charge request.

Throttle control mode includes a "small opening mode", a "large opening charge mode", a "large opening mode", a "throttle charge mode" and a "throttle normal mode".

When engine operating mode is "warm-up mode", "small opening mode" is selected as the throttle control mode. When the "small opening mode" is selected, the opening of the throttle valve 101 is controlled to a "small opening". The "small opening" is a predetermined value previously stored in the ROM of the controller 200. This predetermined value is set to a value smaller than the throttle opening determined depending on the accelerator level during normal control (hereinafter referred to as accelerator-dependent opening).

"Small opening mode" is to be selected with the objective of reducing the amount of exhaust from gasoline engine 100 so as to reduce hydrocarbon discharge, by setting the throttle valve to "small opening" in instances where it is difficult to reduce the hydrocarbon discharge by controlling the gasoline engine 100, or by using the catalyst.

When engine operating mode is "low HC charge mode", the "large opening charge mode" is selected for the throttle control mode. When the "large opening charge mode" is selected, the opening of the throttle valve 101 is set at a value equivalent to the sum of "large opening" and "opening for charge". The "large opening" and "opening for charge" are stipulated values previously stored in the ROM of controller 200. The "large opening" is set to a large value compared to the accelerator dependent opening. The "opening for charge" is set to a value close to the "small opening".

"Large opening charge mode" is to be selected in instances where hydrocarbon discharge can be lowered through control of gasoline engine 100 during the catalyst warm-up period, with the objective of increasing the amount of exhaust from the gasoline engine 100 to accelerate activation of the catalyst in the catalyst converter 190 by setting the throttle valve 101 to "large opening+opening for charge." It is also selected with the objective of increasing output torque from the gasoline engine 100 by as much as possible above the output torque requested by the driver of the vehicle, by setting the throttle valve 101 to "large opening+opening for charge". Output torque in excess of the output torque requested by the driver of the vehicle is converted to electrical power through regeneration by the motor 20, and is used to charge the battery 210.

When engine operating mode is "low HC non-charge mode", the "large opening mode" is selected for the throttle control mode. When the "large opening mode" is selected, the opening of the throttle valve 101 is set at the "large opening".

The "large opening mode" is to be selected with the objective of increasing the amount of exhaust from the gasoline engine 100 to accelerate warming of the catalyst in the catalytic converter 190, by setting the throttle valve 101 to "large opening" in instances where hydrocarbon discharge can be lowered by controlling the gasoline engine 100 during the catalyst warm-up period.

When engine operating mode is "charge mode", "throttle charge mode" is selected for the throttle control mode. When "throttle charge mode" is selected, the opening of the throttle valve 101 is set at a value equivalent to the sum of "accelerator-dependent opening" and "opening for charge".

"Throttle charge mode" is to be selected with the objective of increasing output torque from the gasoline engine 100 above the level of output torque requested by the driver of the vehicle, by setting the throttle valve 101 to the "accelerator-dependent opening+opening for charge". Output torque in excess of the output torque requested by the driver of the vehicle is converted to electrical power through regeneration by the motor 20, charging the battery 210.

When engine operating mode is "non-charge mode", "throttle normal mode" is selected for the throttle control mode. When "throttle normal mode" is selected, the opening of the throttle valve 101 is set at the "accelerator-dependent opening".

"Non-charge mode" is to be selected with the objective of performing normal control.

When engine operating mode is "warm-up mode" and throttle control mode is "small opening mode", even if a battery charge request is received from motor controller 202, the battery charge request will be ignored. This is because, during the period that the "small opening mode" is selected, opening of the throttle valve 101 should be small in order to reduce hydrocarbon discharge, making it difficult to increase output torque from the gasoline engine 100.

Figure 3:
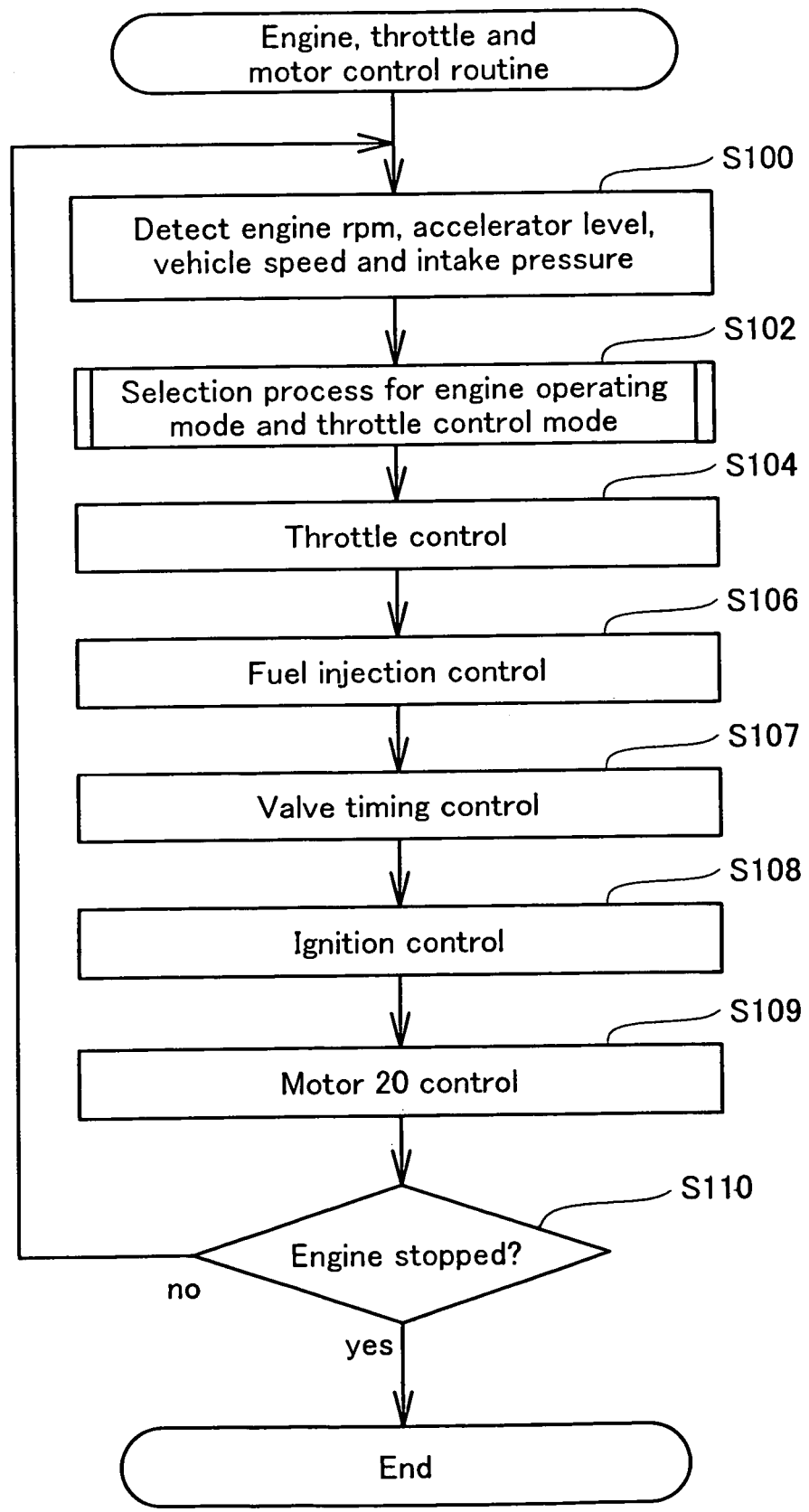
FIG. 3 is a flowchart showing control of the gasoline engine throttle valve and an motor executed by the controller.

Next, lowered hydrocarbon discharge control will be described. FIG. 3 is a flowchart showing control of the gasoline engine 100, throttle valve 101 and motor 20 executed by the controller 200. The description hereinbelow will follow the flowchart.

When the engine, throttle and motor control routine start, the controller 200 initially detects engine rpm, accelerator level, vehicle speed and intake pressure (step S100). Engine rpm is calculated from the output of the crank angle sensor 170. The accelerator level is detected by the accelerator level sensor 160; the vehicle speed is detected by the vehicle speed sensor 165. Intake pressure is the pressure inside the intake passageway, and is detected by the intake pressure sensor 104.

Once engine rpm, accelerator level and vehicle speed have been detected in this manner, a process to select the engine operating mode and the throttle control mode starts (step S102). The selection process of the engine operating mode and throttle control mode will be described in detail later.

When the controller 200 completes selection of the engine operating mode and throttle control mode, throttle control is carried out depending on the selected throttle control mode (step S104).

Next, the controller 200 initiates fuel injection control in response to the engine operating mode and the throttle control mode (step S106). This control involves calculating the amount of air taken into the combustion chamber, based on the pressure inside the intake passageway detected by the intake pressure sensor 104, and injecting fuel, in the quantity required by the air/fuel ratio, from the fuel injection valve 103 under suitable timing.

The ROM built into the controller 200 stores a target air/fuel ratio for each engine operating mode, in a map format having the parameters of engine rpm and the throttle valve opening.

Figure 4:
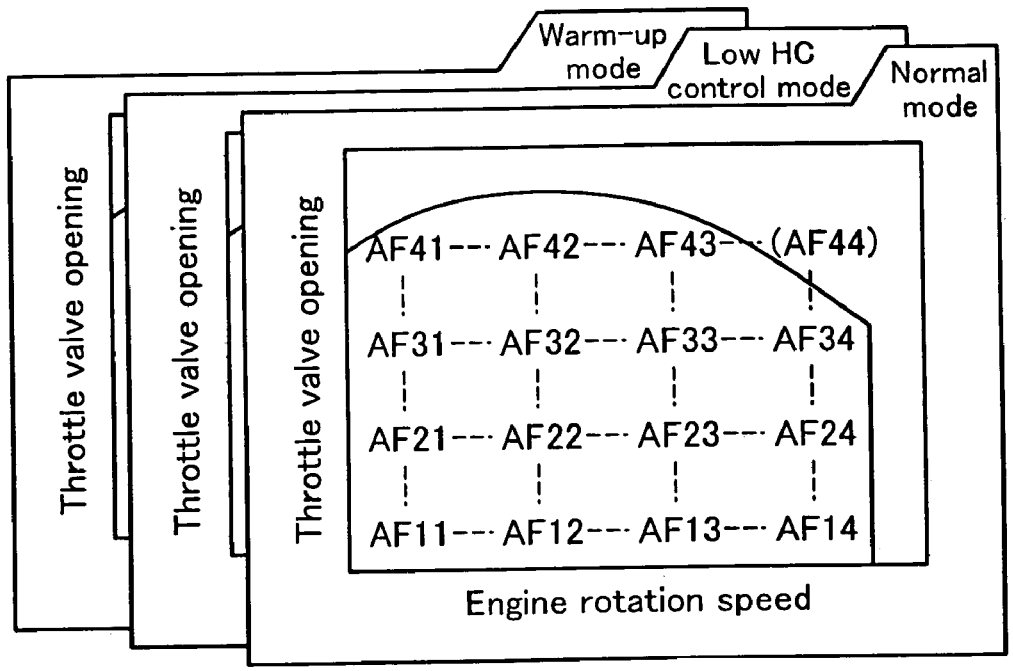
FIG. 4 is an explanatory drawing illustrating a map that stores a target air/fuel ratio.

FIG. 4 is an explanatory drawing illustrating a map storing a target air/fuel ratio. This drawing shows a model of three stored maps, for warm-up mode, low HC control mode, and normal mode. In FIG. 4, the symbols AF11, AF12 . . . represent values of the air/fuel ratio corresponding to engine rpm on the horizontal axis and the throttle valve opening on the vertical axis. For example, when the engine operating mode is the normal mode, a target air/fuel ratio is calculated for the engine rpm and the throttle valve opening by means of interpolation with reference to the map shown at front in FIG. 4. Here, a target value for throttle valve opening determined by the throttle control mode is used as the throttle valve opening (for example, if it is "small opening mode", it will be "small opening"). A sensor that detects the throttle valve opening may also be provided, using a value detected by the sensor as the throttle valve opening.

Next, a fuel injection quantity giving the target air/fuel ratio relative to the quantity of air previously detected, and a fuel injection start timing that corresponds to the fuel injection quantity, are calculated. From the previously stated definition of air/fuel ratio, once the quantity of air and the target air/fuel ratio are determined, the quantity of fuel for injection will be determined accordingly. In addition, if the fuel injection quantity is determined, the injection start timing of the fuel will also be determined. In other words, in the gasoline engine 100 of this embodiment, since the end timing for fuel injection is fixed, fuel injection quantity and the fuel injection start timing have a one-to-one relationship; and if the fuel injection quantity is determined, the fuel injection start timing will also be determined accordingly. After the fuel injection start timing is determined, as described above, during fuel injection control (step S106 in FIG. 3), control is performed to drive the fuel injection valve 103 at a suitable timing, based on the output of the crank angle sensor 170.

When the fuel injection control ends, controller 200 initiates valve timing control (step S107). In valve timing control, the valve open/valve shut intervals of the intake valve 121 and the exhaust valve 122 are controlled. Maps similar to that in FIG. 4, having engine rpm plotted on the horizontal axis and throttle valve opening on the vertical axis, wherein valve open/valve closed periods are recorded, are used for control of valve timing. Maps are prepared for intake valve 121 and the exhaust valve 122, respectively, to record valve open periods and the valve closed periods for each of these. Maps of valve open periods and valve closed periods are prepared separately for warm-up mode, low HC control mode, and normal mode. Using these maps, target valve open periods and target valve closed periods for the intake valve 121 and the exhaust valve 122, corresponding to engine operating mode, engine rpm and throttle valve opening, may be calculated through interpolation. It is also possible for valve open/valve closed periods to be represented in terms of crank angle from the top dead center or the bottom dead center.

In valve timing control, once target valve open periods and the target valve closed periods for the intake valve 121 and the exhaust valve 122 that correspond to the engine operating conditions have been calculated in this manner, valve timing is controlled by opening and closing the intake valve 121 and the exhaust valve 122 at a suitable timing, based on the output of the crank angle sensor 170.

When the valve timing control ends, the controller 200 initiates ignition control (step S108). In ignition control, a process to ignite the air-fuel mixture inside the combustion chamber by means of a spark from the spark plug 102 is carried out at a suitable timing. The ignition timing is established based on a map stored in the ROM of the controller 200.

Figure 5:
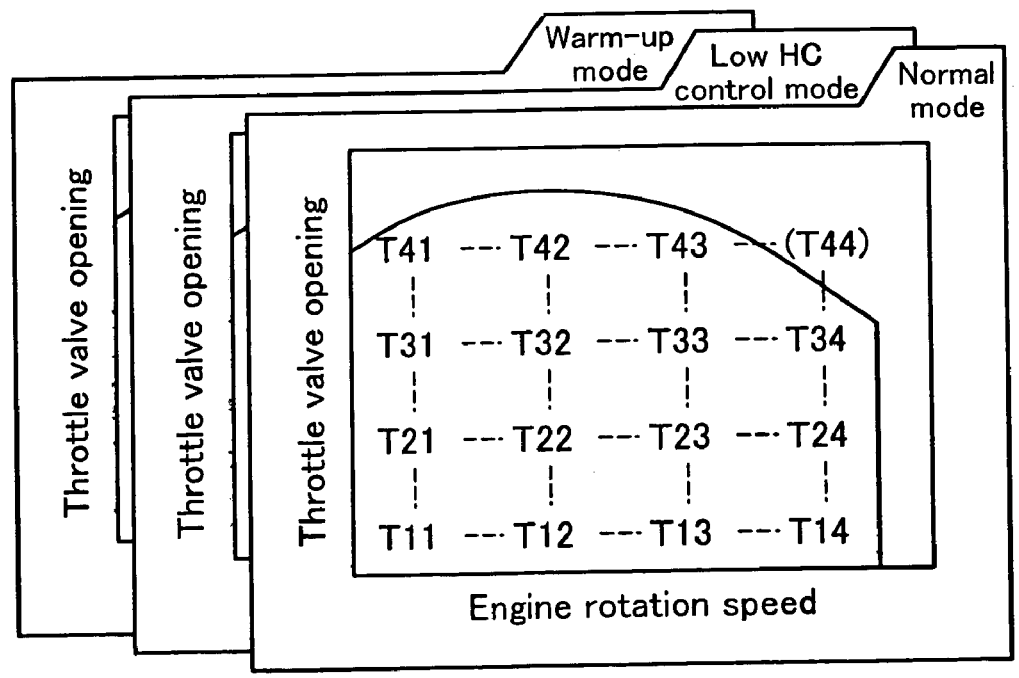
FIG. 5 is an explanatory drawing illustrating a map that stores a target ignition period.

FIG. 5 conceptually illustrates recorded ignition timing for warm-up mode, low HC control mode, and normal mode, in the format of maps having engine rpm and throttle valve opening as parameters. In the drawing, T11, T12 . . . represent ignition timing values that correspond to the engine rpm on the horizontal axis and the throttle valve opening on the vertical axis. Interpolation is also performed from the map shown in FIG. 5 to calculate ignition timing during ignition control, analogous to calculation of the target air/fuel ratio during the fuel injection control described above. After the ignition control calculates ignition timing in response to engine operating condition in this manner, control is performed to ignite the air-fuel mixture inside the combustion chamber, by means of driving the spark plug 102 at a suitable timing based on the output of the crank angle sensor 170.

After the step S108 of FIG. 3, the controller 200 determines a target torque based on the accelerator level and vehicle speed entered in step S100 and the throttle control mode selected in step S102, and controls the motor 20 (Step S109). The target torque of the motor 20 is determined based on a map stored in the ROM of the controller 200.

Figure 6:
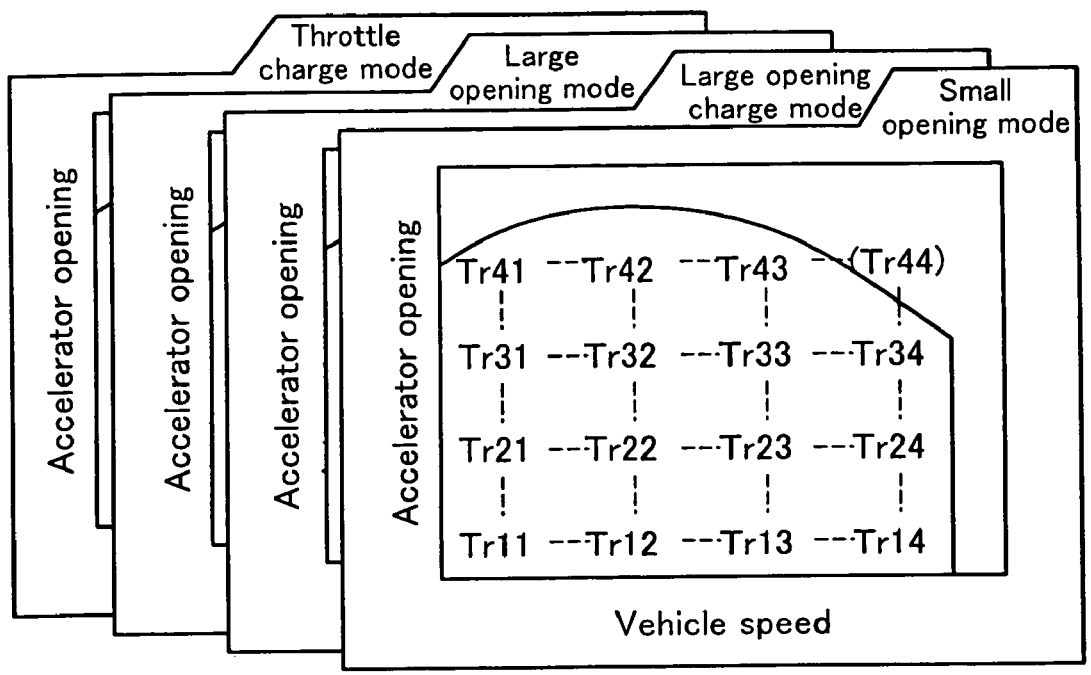
FIG. 6 is an explanatory drawing illustrating a map that stores a target torque.

FIG. 6 shows the format of a map having vehicle speed and accelerator level as the parameters. This drawing conceptually shows a state wherein target torque for each throttle control mode is stored. Tr11, Tr12 . . . represent values of the target torque corresponding to vehicle speed on the horizontal axis and accelerator level on the vertical axis. Interpolation is performed from the map shown in FIG. 6 to calculate the target torque during motor control analogous to calculation of the target air/fuel ratio during the fuel injection control described above. In motor control, the motor 20 is controlled to send control signals to the inverter 220, after calculating target torque in response to the operating condition in this manner.

Since a battery charge request is not present in the throttle normal mode, all the output torque from the gasoline engine 100 is used for power, and the opening of the throttle valve 101 is set depending on the accelerator level. Consequently, the power requested by the driver of the vehicle is output from the gasoline engine 100 as-is. Because of this, there is no need to control the motor 20 so no map is prepared.

Next, the controller 200 verifies whether or not a command has been made to stop the engine (Step S110). If a command to stop the engine has not been made, the process returns to step S100 and repeats the series of processes. When a command to stop the engine has been made, the engine, throttle and motor control routine terminates. In this manner, the gasoline engine 100 is operated under the control of the controller 200 according to the routine of FIG. 3, to generate power in response to the command of the driver of the vehicle.

Figure 7:
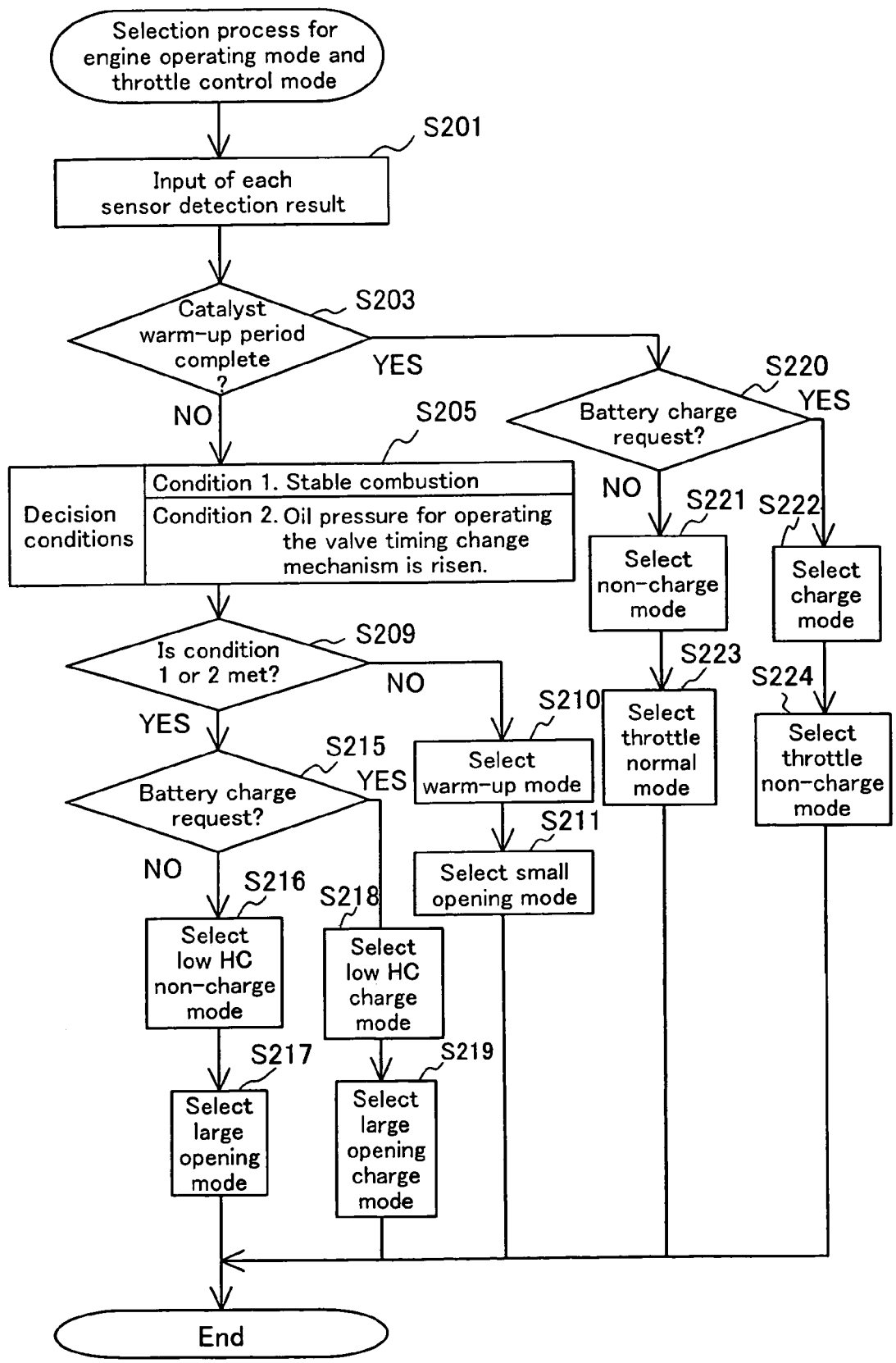
FIG. 7 is a flowchart showing the selection process of the engine operating mode and throttle control mode.

Here, the aforementioned selection process for engine operating mode and throttle control mode will be described. FIG. 7 is a flowchart showing the selection process of the engine operating mode and throttle control mode. This process is performed by the judgement unit 203 of the controller 200.

First, the controller 200 receives detection result from each sensor (Step S201). In more concrete terms, controller 200 receives the temperature inside the catalyst converter 190; time elapsed since startup of the gasoline engine 100; and oil pressure that operates the valve timing change mechanism. Here, the presence of a battery charge request from the motor controller 202 is input as well.

In the event of a decision that the catalyst warm-up period is not complete, based on the temperature inside the catalyst converter 190 (Step S203), a conditional decision is made as to whether the low HC control mode can be selected as the engine operating mode (Step S205).

The conditions are as follows.
1. Combustion is Stable.
2. The Valve Timing Change Mechanism is Operable.

In low HC control mode, various controls may be performed, such as setting the valve overlap to a value equal to or greater than a predetermined value, retarding the ignition timing of the gasoline engine 100, and setting the air/fuel ratio to lean. In order to retard the ignition timing or to set the air/fuel ratio to lean, however, combustion should be stable. In addition, in order to set the valve overlap quantity equal to or more than a predetermined value, the valve timing change mechanism should be operable. Thus, a decision is made on the basis of conditions 1 and 2, as to whether low HC control mode can be selected.

With respect to condition 1, if a predetermined time has passed since starting the gasoline engine 100, it is judged that the combustion is stable. "Predetermined time" is stored in the ROM of the controller 200. With respect to condition 2, if the oil pressure for operating the valve timing change mechanism rises to a value equal to or greater than a predetermined value, it is judged that the valve timing change mechanism is operable. "Predetermined value" is stored in the ROM of the controller 200. Since oil pressure for operating the valve timing change mechanism represents the oil pressure of an oil pressure pump driven by the gasoline engine 100, the value will not be equal to or more than the predetermined value unless a predetermined time has passed after starting the gasoline engine 100. In short, in order for the low HC control mode to be selected, the predetermined time should have elapsed since starting the gasoline engine 100. The two conditions may be summarized to a single condition, namely "predetermined time period has been elapsed since starting gasoline engine 100".

The application condition column of FIG. 2 also includes "predetermined time" in "predetermined time period has been elapsed since starting gasoline engine". This is the time period until low HC control mode can be selected as the engine operating mode. Consequently, it is a time period until condition 1 and condition 2 is met.

When neither condition 1 or condition 2 is met (Step S209), the controller 200 does not select low HC control mode as the engine operating mode, and instead selects warm-up mode (Step S210). In other words, whenever it is impossible to select controls of setting valve overlap to a value equal to or more than a predetermined value, retarding the ignition timing of the gasoline engine 100, and setting the air/fuel ratio to lean, warm-up mode will be selected as the engine operating mode.

The controller 200 then selects the small opening mode as the throttle control mode (Step S211). Selecting the small opening mode as the throttle control mode makes it possible to reduce the amount of exhaust from the gasoline engine 100, as well as reducing hydrocarbon discharge, even if an operation to reduce hydrocarbon discharge cannot be performed by the gasoline engine 100.

FIG. 8(*a*) shows control of ignition timing, FIG. 8(*b*) shows control of the valve overlap (O/L) by the valve timing change mechanism, FIG. 8(*c*) shows control of the air/fuel ratio (A/F) and rpm (Ne), and FIG. 8(*d*) shows the opening control of throttle valve 101. FIGS. 8(*a*)–8(*d*) have the time plotted on the horizontal axis, and have same time axis.

In FIGS. 8(*a*)–8(*d*), the broken line graph shows results of control performed in the conventional manner (hereinafter referred to as conventional control); the solid line graph shows control results obtained in the embodiment. As shown in FIG. 8(*a*), since combustion is unstable immediately after starting the gasoline engine 100, there is no choice but to advance the ignition timing by a value equal to or more than a predetermined value. In the embodiment, warm-up mode is selected as the engine operating mode for the period during which the ignition timing is advanced by a value equal to or more than a predetermined value, immediately after starting the gasoline engine.

As shown in FIG. 8(*b*), since the valve timing change mechanism cannot operate immediately after the gasoline engine 100 has been started, the valve overlap (O/L) cannot be set to a value equal to or more than a predetermined value. In this embodiment, warm-up mode is selected as the engine operating mode for the period during which valve overlap (O/L) cannot be set a value equal to or more than a predetermined value.

In control shown in FIG. 8(*b*), after waiting until oil pressure rises to a level enabling valve overlap (O/L) to be changed from the initial value to 20 degrees, there is a transition to a low HC non-charge mode wherein valve overlap (O/L) is set to above a predetermined value. In conventional control, since valve overlap (O/L) only changes from the initial value to 2 degrees, while the wait time from engine startup to the rise in oil pressure is shorter, valve overlap (O/L) is far less than that of the embodiment.

As shown in FIG. 8(*c*), because the combustion is unstable after starting the gasoline engine 100, the air/fuel ratio (A/F) should be set to rich. In this embodiment, warm-up mode is selected as the engine operating mode for the period during which the air/fuel ratio (A/F) should be set to rich.

Returning to FIG. 7, if either condition 1 or condition 2 is met (Step S209) and if there has been no battery charge request during the input of step S201 (Step S215), the controller 200 selects low HC non-charge mode by means of controls suitable for the condition met (Step S216). In other words, where condition 1 is met, the controller 200 selects low HC non-charge mode for the engine operating mode by means of control of the fuel injection valve 103 and the spark plug 102; where condition 2 is met, it selects low HC non-charge mode for the engine operating mode by means of control of the valve timing change mechanism.

In the engine operating mode by means of the valve timing change mechanism shown in FIG. 8(*b*), condition 2 determines the timing for transition to low HC non-charge mode. The warm-up mode interval in FIG. 8(*b*) is different from that in FIG. 8(*a*) or FIG. 8(*c*), in which condition 1 determines the timing for transition to low HC non-charge mode.

After step S216 of FIG. 7, the controller 200 selects large opening mode as the throttle control mode (Step S217). Since the engine operating mode is the low HC non-charge mode by means of the fuel injection valve 103, the spark plug 102 or the valve timing change mechanism to reduce the amount of hydrocarbons discharged from the gasoline engine 100, it is possible to set the opening of the throttle valve 101 to "large opening" to accelerate activation of the catalyst.

If there is a battery charge request during input of Step S201 (Step S215), the controller 200 selects low HC charge mode as the engine operating mode by means of controls suitable for the condition met (Step S218), then selects the large opening charge mode as the throttle control mode (Step S219). When there is a battery charge request, the opening of the throttle valve 101 is set to "large opening+opening for charge" and the torque required to charge the battery 210 is output by the gasoline engine 100.

As a variation, it may be judged to select either low HC charge mode or low HC non-charge mode by means of all suitable control settings only when both condition 1 and condition 2 are met. Further, it may be judged to select either large opening mode or large opening charge mode as the throttle control mode only when both condition 1 and condition 2 are met.

If the controller 200 decides that the catalyst warm-up period has completed by checking the temperature inside the catalyst converter 190 (Step S203), and if there is no battery charge request during the input of Step S201 (Step S220), the controller 200 selects non-charge mode as the engine operating mode (Step S221), and throttle normal mode as the throttle control mode (Step S223).

On the other hand, when a decision is made that the catalyst warm-up period has completed (Step S203), and there is a battery charge request during the input of Step S201 (Step S220), the controller 200 selects charge mode as the engine operating mode (Step S222), and throttle charge mode as the throttle control mode (Step S224). In the latter case, opening of the throttle valve 101 is set to "accelerator dependent opening+opening for charge", and the torque required to charge the battery 210 is output from the gasoline engine 100.

The solid lines of FIG. 8(*a*)–8(*c*) show control performed when condition 1 or condition 2 is met after a predetermined period has elapsed since starting the engine, and low HC non-charge mode has been selected as the engine control mode. It will be appreciated that after the predetermined period has passed, ignition time is retarded as shown in FIG. 8(*a*), and valve overlap is increased to a value equal to or more than a predetermined value as shown in FIG. 8(b), and the air/fuel ratio is made leaner as shown in FIG. 8(c). Even in conventional control, the air/fuel ratio is made lean once an arbitrary time period has passed since starting the engine; in the embodiment, however, the reason it is possible to make the air/fuel ratio lean sooner than in conventional control is the result of pre-heating the A/F sensor that measures the air/fuel ratio (A/F), making it possible to detect the air/fuel ratio early on.

Figure 8A:
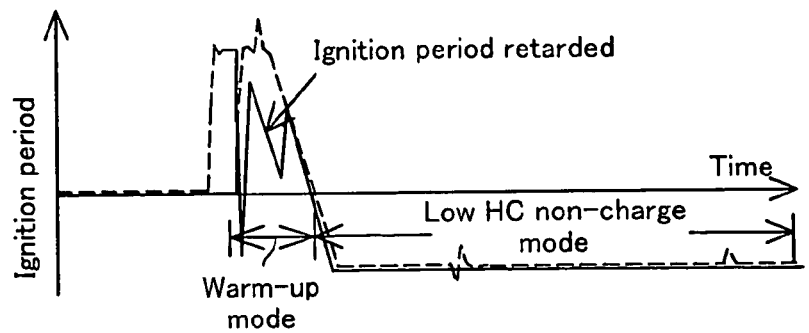
FIGS. 8(a) through 8(d) show control results of the embodiment.
Figure 8B:
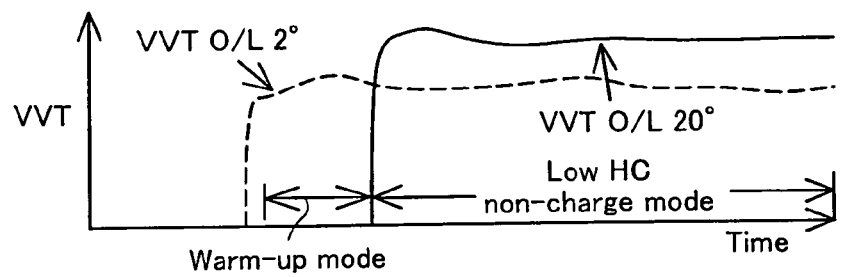
Figure 8C:
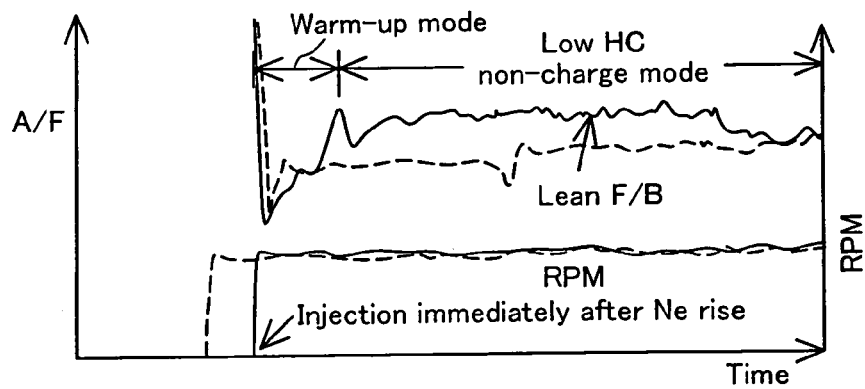
Figure 8D:
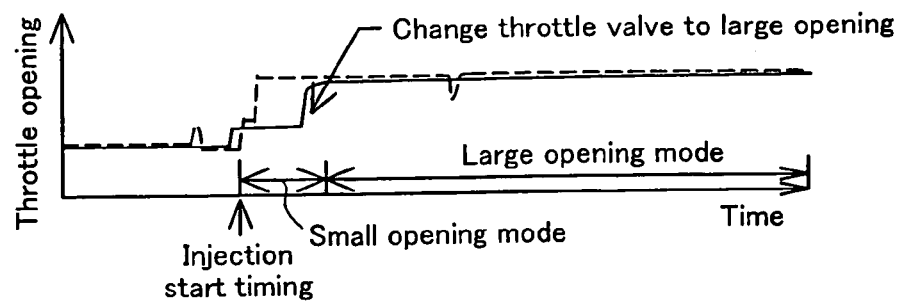

It will be appreciated from FIG. 8(d) that after a predetermined period has passed since starting the engine, when condition 1 or condition 2 is met, large opening mode is selected as the throttle control mode, and the opening of the throttle valve 101 is set to "large opening".

With control performed as set forth in the embodiment, during the period for which control in low HC non-control mode is not carried out in gasoline engine 100, the throttle opening is set to a small opening, thereby making it possible to reduce hydrocarbon discharge. Where hydrocarbon discharge is reduced by control low HC non-charge mode or low HC charge mode by the gasoline engine 100, the throttle opening is set to a large opening, or to a "large opening+ opening for charge", thereby making it possible to accelerate activation of the catalyst.

In other words, according to this embodiment, controlling the throttle valve 101 and the gasoline engine 100 makes it possible to lower hydrocarbon discharge, while shortening the catalyst warm-up period. Shortening the catalyst warm-up period makes it possible to reduce the total quantity of hydrocarbons discharged from engine startup to the end of the catalyst warm-up period. Once the catalyst warms up, it is no longer necessary to operate the gasoline engine 100 in low HC control mode, thereby making it possible to provide optimum control, taking into consideration fuel efficiency and drivability. Furthermore, torque substantially equal to the output torque requested from the gasoline engine 100 by the driver of the vehicle is output, by means of outputting drive torque and regenerative torque created by the motor 20 during control of the throttle valve 101.

Figure 9:
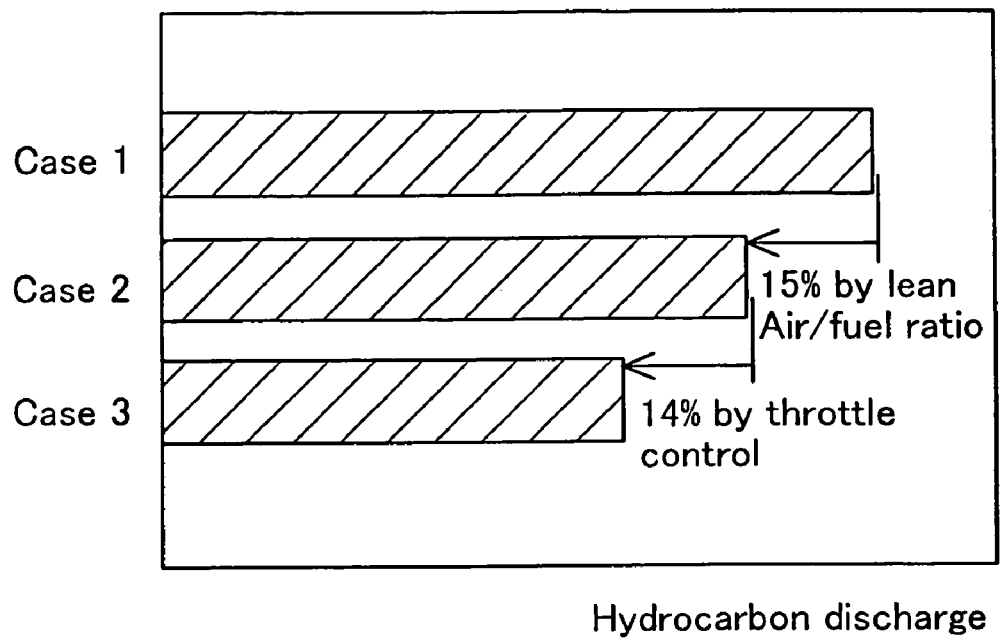
FIG. 9 is an explanatory drawing showing experimental results of measurements of hydrocarbon discharge.

FIG. 9 is an explanatory drawing showing experimental results of measurements of hydrocarbon discharge. Each case is shown by a bar graph indicating total quantity of discharged hydrocarbons from engine startup until the end of the catalyst warm-up period. The horizontal axis of the graph indicates the hydrocarbon discharge. Case 1 is hydrocarbon discharge when conventional control is performed. In contrast, case 3 is hydrocarbon discharge when control is performed according to the embodiment. It will be appreciated that control performed according to the embodiment makes it possible to reduce hydrocarbon discharge.

Case 2 shows hydrocarbon discharge when the air/fuel ratio is made lean at a point in time earlier than in conventional control or, in other words, when low HC control is performed in the engine, but control of the throttle opening is not performed. Hydrocarbon discharge can be reduced even further when control according to the embodiment is performed in conjunction with control of the throttle opening.

B. Variations

While the present invention has been described hereinabove through a specific embodiment, the invention is not limited thereto, and may be modified in various ways without departing from the scope and spirit of the invention. For example, in step S211 of FIG. 7, when the throttle control mode is small opening mode, no distinction between the presence or absence of a battery charge request is made, that is, battery charge requests are ignored; however, in step S211 of FIG. 7, rather than ignoring battery charge requests, the frequency at which battery charge requests are output may be reduced by having the motor controller 202 reduce the reference value of the remaining capacity of the battery 210 for the battery charge request.

Apart from the arrangement described in the embodiment, various other control modes may be applicable to low HC control mode, provided that control enabling lowered hydrocarbon emission is possible in the gasoline engine 100. Moreover, during the catalyst warm-up period, while the opening of the throttle valve 101 may be set to one of the fixed values of small opening, large opening, or large opening+opening for charge, the available opening values are not necessarily fixed in this manner. For small opening mode, the opening may be varied to be equal to or less than the small opening; for the large opening mode, the opening may be varied to be equal to or more than the large opening. For large opening charge mode, the opening may be varied to be equal to or more than the large opening+opening for charge. The opening for charge may also be varied.

Further, in the embodiment, where control that reduces hydrocarbon discharge is possible in the gasoline engine 100, the opening of the throttle valve 101 is set to large opening or to large opening+opening for charge. However, this type of opening is not always required, and it is acceptable to use accelerator-dependent opening instead. Where the opening is accelerator-dependent, it will be possible to output at least the level of output requested of the gasoline engine 100.

What is claimed is:

1. A power output apparatus comprising:
    an engine that outputs power to a drive shaft;
    an air flow rate adjustment mechanism that adjusts an air flow rate supplied to the engine;
    an exhaust system having a catalyst, for discharging exhaust gas from the engine;
    a first suppression controller that, after startup of the engine, controls the air flow rate adjustment mechanism so as to limit the air flow rate to a level equal to or less than a predetermined flow rate; and
    a second suppression controller that, at a predetermined timing, transitions an operation of the engine to a reduced hydrocarbon operation state established so as to reduce a quantity of hydrocarbons within the exhaust gas, and cancels the limit on the air flow rate, wherein the air flow rate during a control of the first suppression controller is less than the air flow rate during a control of the second compression controller.

2. A power output apparatus according to claim 1, wherein the first and second suppression controllers perform the control during a period in which the catalyst is not activated.

3. A power output apparatus according to claim 1, wherein the second suppression controller cancels the limit on the air flow rate and controls the air flow rate adjustment mechanism such that the air flow rate is greater than the predetermined flow rate.

4. A power output apparatus according to claim 1, wherein the second suppression controller performs, in the reduced hydrocarbon operation state, at least one of the following: retarding an ignition timing by an amount greater than a predetermined value; shifting an air/fuel ratio to lean; and, where a valve overlap varying mechanism that opens both intake and exhaust valves of the engine and that has variable valve overlap is provided, controlling the valve overlap varying mechanism so that valve overlap exceeds a predetermined value.

5. A power output apparatus according to claim 1, further comprising:
an electric motor capable of outputting power to the drive shaft; and
an electric motor controller that, based on the air flow rate and a requested level of output for the power output apparatus, controls power of the electric motor.

6. A power output apparatus according to claim 1, further comprising:
a generator that generates electrical power using power output from the engine; and
an electrical power generation controller that, during control by the first suppression controller, controls the generator such that electrical power generated by the generator is equal to or less than electrical power generatable with the power output from the engine.

7. A power output apparatus according to claim 6, further comprising:
a chargeable/dischargeable charge storage; and
a detector that detects remaining capacity of the electrical charge storage;
wherein the generator charges the electrical charge storage, and the electrical power generation controller controls the generator based on the remaining capacity.

8. A power output apparatus according to claim 7, wherein during control by the first suppression controller, the electrical power generation controller prohibits the generator from generating electrical power, irregardless of the remaining capacity.

9. A power output apparatus according to claim 7, wherein during control by the first suppression controller, the electrical power generation controller reduces a reference value for the remaining capacity of the electrical charge storage for starting the charge by the generator.

10. A power output apparatus comprising:
an engine that outputs power to a drive shaft;
an air flow rate adjustment mechanism that adjusts an air flow rate supplied to the engine;
an exhaust system that discharges exhaust gas from the engine;
a catalyst disposed in the exhaust system;
a normal controller that performs normal operation of the engine when the catalyst has been activated;
a first hydrocarbon suppression controller that, when the catalyst has not been activated, controls operation of the engine so as to reduce a concentration of hydrocarbons within the exhaust gas to an amount less than that during normal operation, before passage through the catalyst; and
a second hydrocarbon suppression controller that, during at least a predetermined period after startup of the engine, prohibits operation of the first hydrocarbon suppression controller, and controls the air flow rate adjustment mechanism so as to reduce the air flow rate to a value equal to or less than a predetermined value, wherein the air flow rate during a control of the first hydrocarbon suppression controller is greater than the air flow rate during a control of the second hydrocarbon suppression controller.

11. A power output apparatus according to claim 10, wherein the first hydrocarbon suppression controller includes a flow rate controller that controls the air flow rate adjustment mechanism so as to ensure that an air flow rate consistent with an output request for the engine.

12. A power output apparatus according to claim 10, wherein the first hydrocarbon suppression controller includes an air flow rate controller that controls the air flow rate adjustment mechanism so as to increase the air flow rate to a level higher than the predetermined flow rate.

13. A method of controlling a power output apparatus, the power output apparatus comprising an engine that outputs power to a drive shaft, an air flow rate adjustment mechanism that adjusts the air flow rate supplied to the engine, and an exhaust system having a catalyst for discharging exhaust gas from the engine, the method comprising:
performing a first suppression control wherein, after startup of the engine, the air flow rate adjustment mechanism is controlled so as to limit the air flow rate to a level equal to or less than a predetermined flow rate; and
performing a second suppression control wherein, at a predetermined timing, an operation of the engine is transitioned to a reduced hydrocarbon operation state established so as to reduce a quantity of hydrocarbons within the exhaust gas; and the limit on the air flow rate is cancelled, wherein the air flow rate during the first suppression control is less than the air flow rate during the second suppression control.

14. A method according to claim 13, wherein the first and second suppression controls are performed during a period in which the catalyst is not activated.

15. A method according to claim 13, wherein the second suppression control includes canceling the limit on the air flow rate and controlling the air flow rate adjustment mechanism such that the air flow rate is greater than the predetermined flow rate.

16. A method according to claim 13, wherein the second suppression control includes, in the reduced hydrocarbon operation state, at least one of the following: retarding an ignition timing by an amount greater than a predetermined value; shifting an air/fuel ratio to lean; and, where a valve overlap varying mechanism that opens both intake and exhaust valves of the engine and that has variable valve overlap is provided, controlling the valve overlap varying mechanism so that valve overlap exceeds a predetermined value.

17. A method according to claim 13, wherein the power output apparatus further comprises an electric motor capable of outputting power to the drive shaft, and
wherein the method further comprises controlling power of the electric motor based on the air flow rate and a requested level of output for the method.

18. A method according to claim 13, the power output apparatus further comprises a generator that generates electrical power using power output from the engine, and
wherein the method further comprises, during the first suppression control, controlling the generator such that electrical power generated by the generator is equal to or less than electrical power generatable with the power output from the engine.

19. A method according to claim 18, wherein the power output apparatus further comprises a chargeable/dischargeable charge storage that is charged by the generator, and a detector that detects remaining capacity of the electrical charge storage, and
wherein the controlling of the generator is carried out based on the remaining capacity.

20. A method according to claim 19, wherein during the first suppression control, the controlling of the generator prohibits the generator from generating electrical power, irregardless of the remaining capacity.

21. A method according to claim 19, wherein during the first suppression control, the controlling of the generator reduces a reference value for the remaining capacity of the electrical charge storage for starting the charge by the generator.

22. A method of controlling a power output apparatus, the power output apparatus comprising an engine that outputs power to a drive shaft, an air flow rate adjustment mechanism that adjusts the air flow rate supplied to the engine, and an exhaust system having a catalyst for discharging exhaust gas from the engine, the method comprising:

performing a normal control wherein the engine is operated normally after the catalyst has been activated;

performing a first hydrocarbon suppression control wherein, when the catalyst has not been activated, operation of the engine is controlled so as to reduce a concentration of hydrocarbons within the exhaust gas to an amount less than that during normal operation, before passage through the catalyst; and performing a second hydrocarbon suppression control wherein, during at least a predetermined period after startup of the engine, operation of the first hydrocarbon suppression control step is prohibited, and the air flow rate adjustment mechanism is controlled so as to reduce the air flow rate to a value equal to or less than a predetermined value, wherein the air flow rate during the first hydrocarbon suppression control is greater than the air flow rate during the second hydrocarbon suppression control.

23. A method according to claim 22, wherein the first hydrocarbon suppression control includes controlling the air flow rate adjustment mechanism so as to ensure that an air flow rate consistent with an output request for the engine.

24. A method according to claim 22, wherein the first hydrocarbon suppression control includes controlling the air flow rate adjustment mechanism so as to increase the air flow rate to a level higher than the predetermined flow rate.

* * * * *